(12) United States Patent
Umemura et al.

(10) Patent No.: US 6,619,221 B2
(45) Date of Patent: Sep. 16, 2003

(54) OSCILLATION SUPPRESSION DEVICE

(75) Inventors: Katsuya Umemura, Komaki (JP); Youhei Ando, Komaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/114,051

(22) Filed: Apr. 3, 2002

(65) Prior Publication Data

US 2003/0029367 A1 Feb. 13, 2003

(30) Foreign Application Priority Data

Aug. 10, 2001 (JP) ........................................ 2001-244236

(51) Int. Cl.[7] ................................................ B63B 9/08
(52) U.S. Cl. ............................ 114/121; 74/5.5; 74/5.7; 114/122
(58) Field of Search ................................ 114/121, 122; 244/165; 74/5.22, 5.5, 5.7

(56) References Cited

U.S. PATENT DOCUMENTS

| | | | |
|---|---|---|---|
| 1,416,038 A | 5/1922 | Lamme | |
| 5,559,381 A | * 9/1996 | Bosley et al. | ................. 310/74 |
| 5,628,267 A | 5/1997 | Hoshio et al. | |
| 5,839,386 A | 11/1998 | Frieling et al. | |

FOREIGN PATENT DOCUMENTS

| | | | |
|---|---|---|---|
| DE | 269589 | | 4/1911 |
| EP | 0 650 890 | | 5/1995 |
| JP | 9-144806 | * | 6/1997 |
| JP | 2000-088040 | | 3/2000 |

* cited by examiner

Primary Examiner—Sherman Basinger
(74) Attorney, Agent, or Firm—Oblon, Spivak, McClelland, Maier & Neustadt, P.C.

(57) ABSTRACT

An oscillation suppression device comprises a base body to be secured to a ship body, a gimbals secured to the base body, a damper, a flywheel provided in the gimbals, and a motor for rotating the flywheel, etc. The gimbals is supported by bearings built into a pair of side walls of the base body, respectively, such that it can rotate around a first axis. The flywheel can rotate around a second axis. A rotor member of the motor is attached to the flywheel, and a stator member is attached to the gimbals. The rotor member and stator member are located inside the locus-of-rotation of the gimbals. The base body includes a cover portion covering the outer surface of the gimbals.

3 Claims, 5 Drawing Sheets

OSCILLATION SUPPRESSION DEVICE

CROSS-REFERENCE TO RELATED APPLICATIONS

This application is based upon and claims the benefit of priority from the prior Japanese Patent Application No. 2001-244236, filed Aug. 10, 2001, the entire contents of which are incorporated herein by reference.

BACKGROUND OF THE INVENTION

1. Field of the Invention

This invention relates to an oscillation suppression device for suppressing the oscillation of an object, such as a ship or gondola, whose oscillation is to be suppressed, using gyro torque.

2. Description of the Related Art

An oscillation suppression device using gyro torque is often installed in a ship. As described in, for example, Japanese Patent No. 2813540, a conventional oscillation suppression device comprises a base body secured to a ship body, a gimbals rotatably provided in the base body, a flywheel provided in the gimbals and a motor for spinning the flywheel at a high speed, etc. This motor, which is mounted in the gimbals, is a component that is not integrated with the gimbals or flywheel. The output shaft of the motor is connected to the rotary shaft of the flywheel via a coupler.

In the conventional oscillation suppression device, at least a part of the motor outwardly protrudes from the locus of rotation of the gimbals. Accordingly, when the ship rolls or pitches and the gimbals rocks relative to the base body, the part of the motor rotates along a circle with a radius greater than that of the locus of the gimbals.

In the conventional device, it is necessary to secure, in a ship, a large space required for the gimbals and motor to rock, i.e., required for the attachment of the oscillation suppression device. Moreover, the sound made by the rotation of the motor or flywheel is transmitted to the outside, and is loud. In addition, while the gimbals is rotating, it is possible that the limbs of a crew member standing near the device may be pinched by it.

BRIEF SUMMARY OF THE INVENTION

It is an object of the present invention to provide a gyro-type oscillation suppression device that can be made compact.

An oscillation suppression device according to an aspect of the invention comprises: a base body having an attachment portion to be secured to an object whose oscillation is to be suppressed; a gimbals supported by the base body such that the gimbals can rotate around a first axis; a damper which suppresses rotation of the gimbals relative to the base body; a flywheel provided in the gimbals such that the flywheel can rotate around a second axis perpendicular to the first axis; and a motor which rotates the flywheel, the motor including a rotor member attached to the flywheel, and a stator member attached to the gimbals and opposed to the rotor member with a predetermined gap therebetween, characterized in that: the rotor member and the stator member are located inside a locus-of-rotation along which an outer peripheral of the gimbals rotates around the first axis; and the base body is provided with a cover portion which covers an outer surface of the gimbals.

When an object whose oscillation is to be suppressed has oscillated, the base body and gimbals rotate relative to each other. The term "rotation" recited in this specification includes an angular displacement (rocking) of 360 degrees or less between the base body and gimbals. The gyro torque of the flywheel is exerted to suppress the oscillation of the object, whereby the oscillation of the object is suppressed.

In the oscillation suppression device of the invention, the gyro torque, generated while the flywheel is rotating, suppresses the oscillation of an object whose oscillation is to be suppressed. In the oscillation suppression device of the invention, the motor does not outwardly protrude from the gimbals, and hence the range of oscillation of the gimbals can be made smaller than in the conventional case. The invention can make a compact oscillation suppression device. Further, since the gimbals is covered with a cover portion, the operator or peripheral thing can be protected from being touched by the rocking gimbals, motor or flywheel, etc., and the noise generated therefrom can be reduced.

In the invention, the base body may have a monocoque structure, and a portion of the base body may serve as the cover portion. The base body of the monocoque structure, which also serves as the cover portion, has a high rigidity. This is advantageous for enhancing the strength of the device if a plurality of oscillation suppression devices are used in a vertically stacked state.

In the invention, at least a part of the rotor member may be received in a recess formed in an end face of the flywheel. If the rotor member included in the motor is received in the recess formed in the end face of the flywheel, the gimbals assembly including the motor can be made more compact.

In the invention, the damper may be a dashpot type damper which includes a short cylindrical housing containing a hydraulic fluid, a partition member rotatably received in the housing, and an orifice formed between a first liquid chamber and a second liquid chamber, the partition member partitioning an interior of the housing into the first and second liquid chambers, the partition member rotating within the housing in accordance with rotation of the base body relative to the gimbals. The housing of the damper is exposed to the outside of the cover portion to enhance its heat dissipation.

If the oscillation suppression device of the invention employs the dashpot type flat oil damper, the width of the device can be reduced. Moreover, if the gimbals bearings are built into side walls of the base body, the width of the oscillation suppression device can be further reduced.

Naturally, any structural element of the invention, such as the base body, gimbals, damper, flywheel, motor or cover portion, etc. may be appropriately modified without departing from the scope of the invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Referring to FIGS. 1 to 5, a description will be given of an oscillation suppression device according to a first embodiment of the invention.

Figure 1:
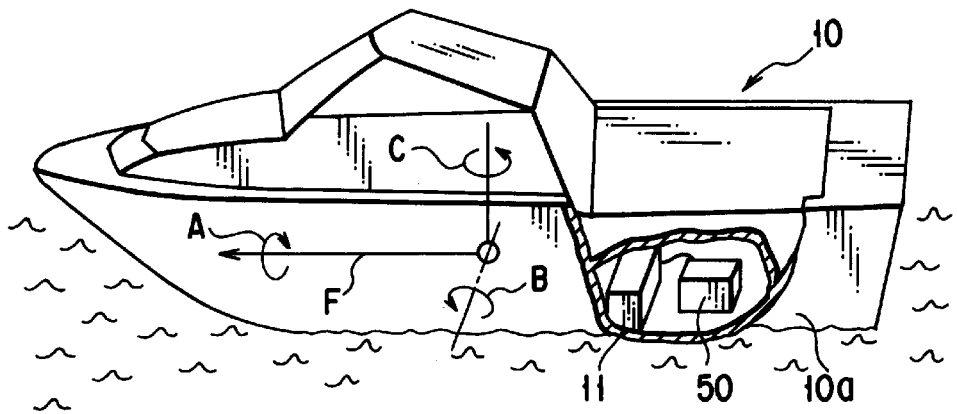
FIG. 1 is a partially broken perspective view illustrating a ship provided with an oscillation suppression device.
Figure 2:
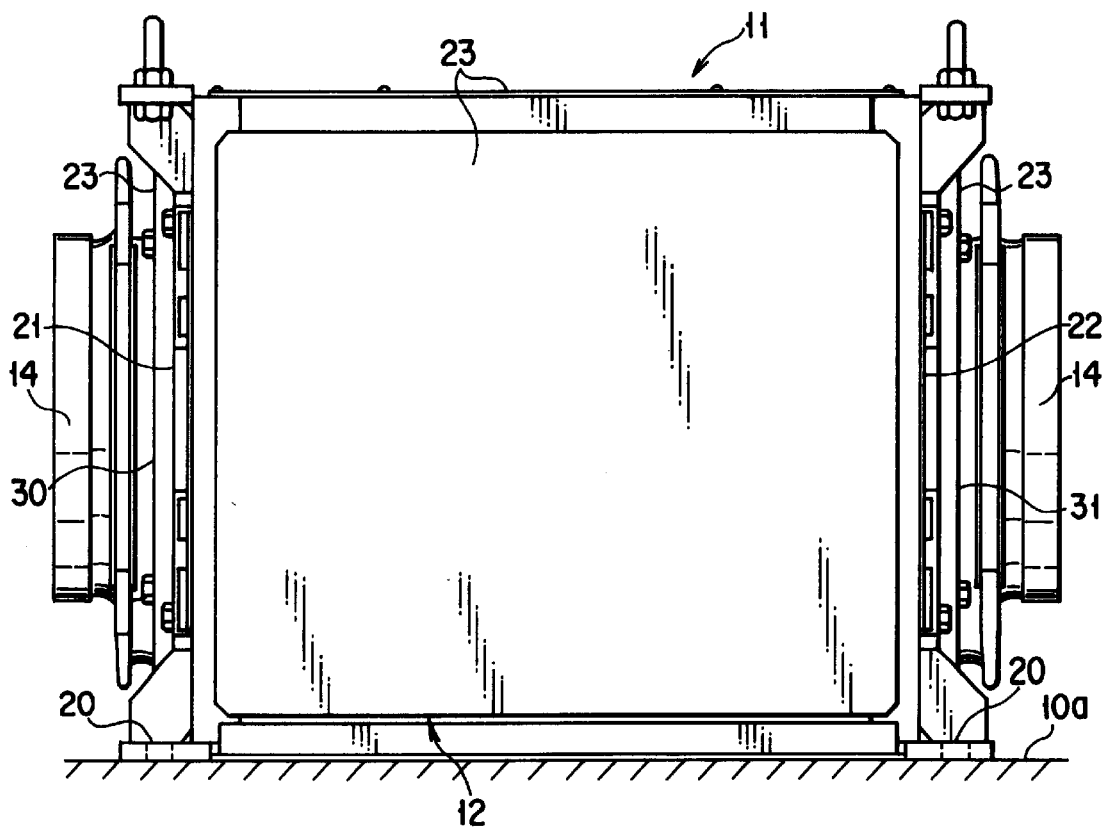
FIG. 2 is a front view illustrating an oscillation suppression device according to a first embodiment of the invention.
Figure 3:
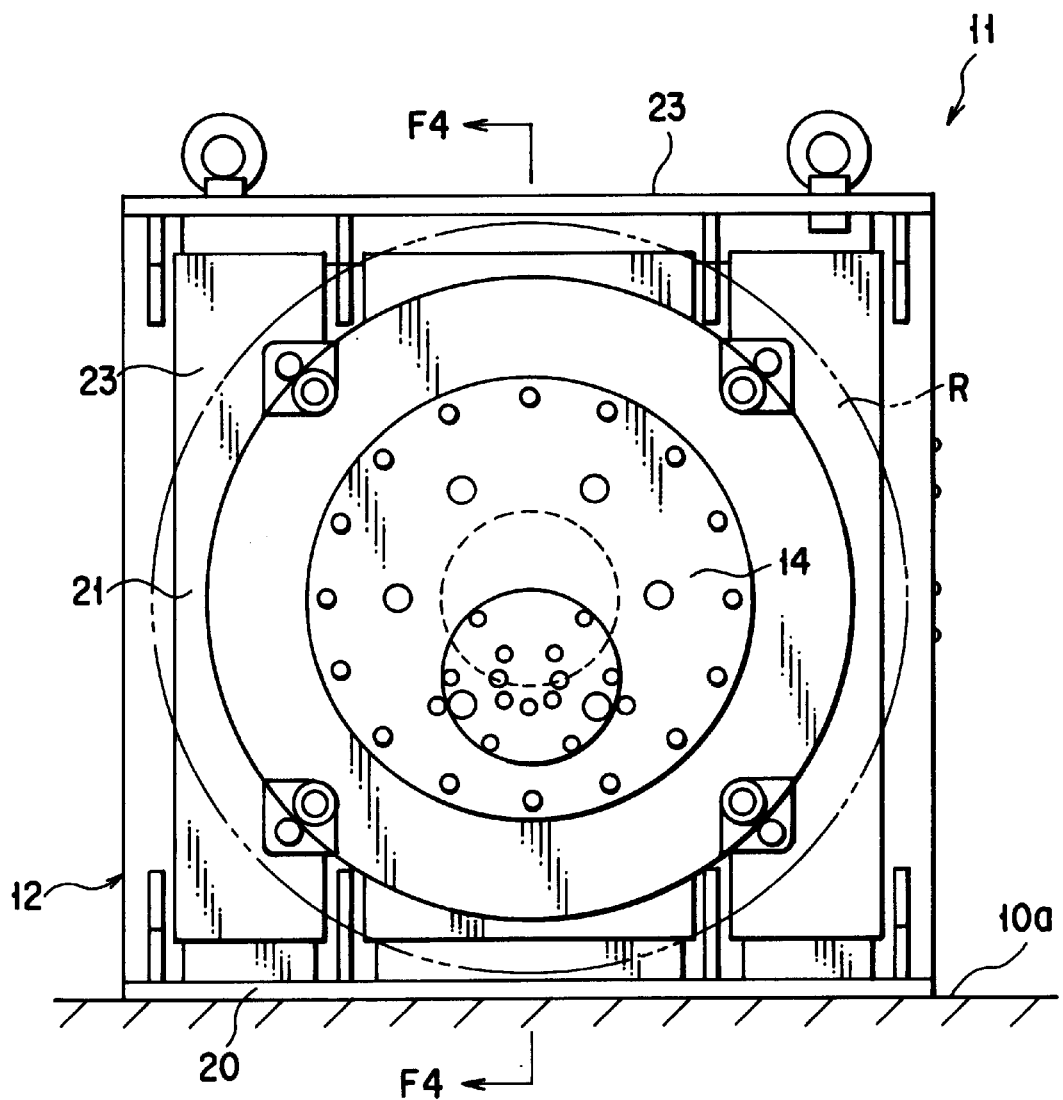
FIG. 3 is a side view illustrating the oscillation suppression device of FIG. 2.
Figure 4:
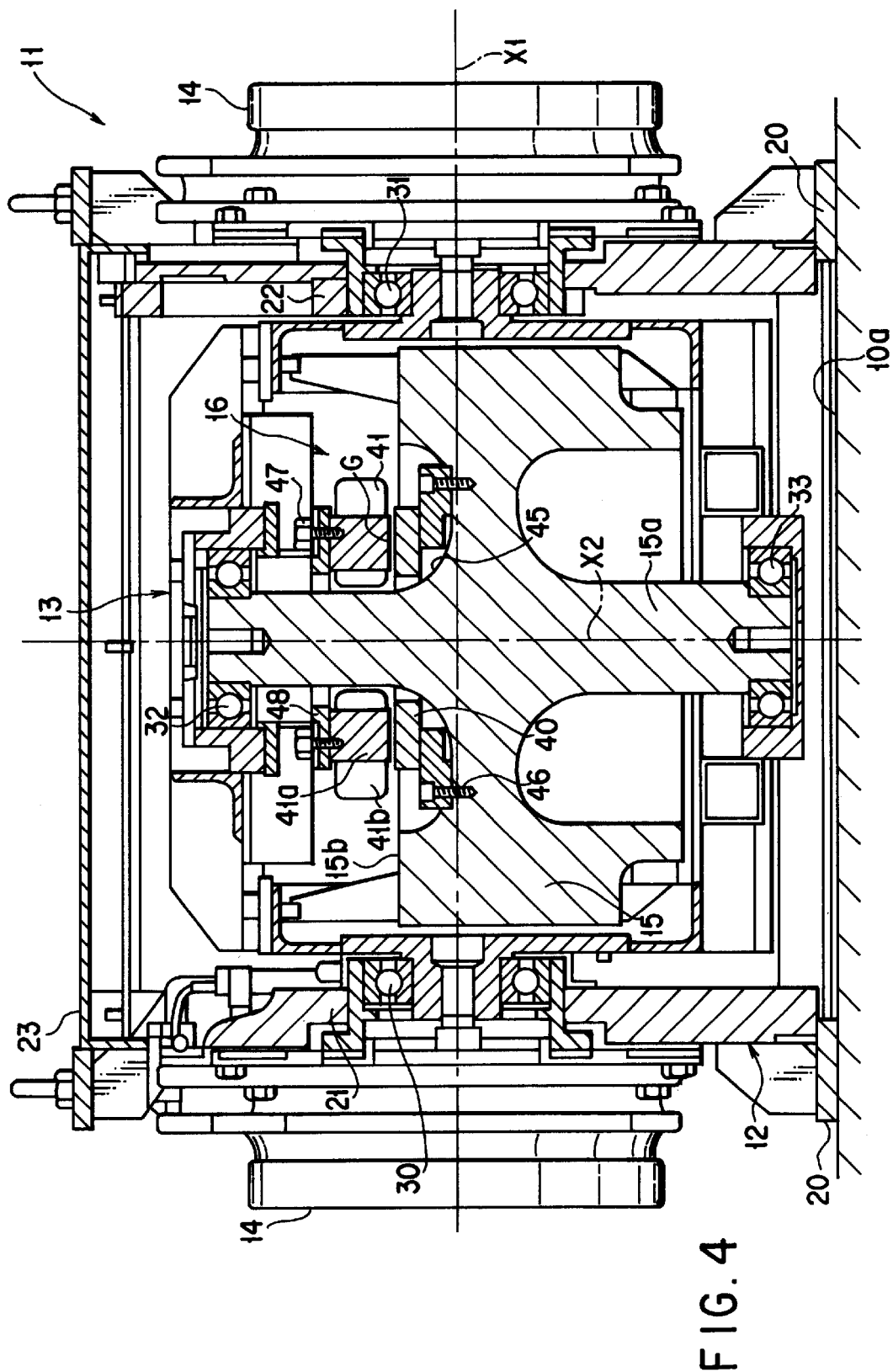
FIG. 4 is a sectional view taken along line F4—F4 in FIG. 3.

An oscillation suppression device 11 is mounted in a ship 10 shown in FIG. 1. As shown in FIGS. 2 to 4, the oscillation suppression device 11 comprises a base body 12, a gimbals 13 provided in the base body 12, a damper 14, a flywheel 15 provided in the gimbals 13, and a motor 16, etc.

The base body 12 has a monocoque structure. The base body 12 includes attachment flange sections 20 secured to a ship body 10a, and a pair of right and left side walls 21 and 22. The ship body 10a is an example of an object whose oscillation is to be suppressed. The attachment sections 20 are fixed to the ship body 10a by coupling members such as bolts. The monocoque-structure base body 12 is formed, like a box, of a material having a predetermined strength.

The monocoque-structure base body 12 has a great stiffness and strength in all directions, for example, in a rolling direction indicated by arrow A in FIG. 1, a pitching direction indicated by arrow B, and a yawing direction indicated by arrow C. A part of the base body 12 serves as a cover section 23 that covers the entire outer surface of the gimbals 13.

As shown in FIG. 4, gimbals bearings 30 and 31 are built into the side walls 21 and 22 of the base body 12, respectively. The gimbals 13 is rotatably attached to the base body 12 via the bearings 30 and 31. The gimbals 13 can rotate around a first axis, i.e., a gimbals axis X1, via the bearings 30 and 31.

The shaft 15a of the flywheel 15 is rotatably supported by the gimbals 13 via a pair of vertical flywheel bearings 32 and 33. The flywheel 15 can rotate around a second axis perpendicular to the first axis, i.e., a flywheel axis X2, via the bearings 30 and 31.

As is shown in FIG. 1, the oscillation suppression device 11 constructed as above is located such that the fist axis (gimbals axis) X1 is perpendicular to the forward direction F of the ship 10. In this state, the second axis (flywheel axis) X2 is vertical to the forward direction F of the ship 10.

The motor 16 includes a rotor member 40 attached to the flywheel 15, and a stator member 41 attached to the gimbals 13. The rotor member 40 is received in a recess 45 formed in an end face 15b of the flywheel 15. The rotor member 40 is fixed to the flywheel 15 by a bolt 46.

The stator member 41 has its core 41a fixed to a portion 48 of the gimbals 13 by a bolt 47. The core 41a is wound by a coil 41b. The rotor member 40 and stator member 41 are opposed to each other in a direction along the second axis X2. An air gap G of about 1 mm is defined between the members 40 and 41.

In other words, the motor 16 is an axial gap-type motor (flat type inductor motor).

The rotor member 40 and stator member 41 are located inside a locus-of-rotation R (see FIG. 3), along which that portion of the gimbals 13, which is remotest from the first axis X1, moves while the gimbals 13 rotates around the axis X1. In other words, the motor 16 is an inner motor, the members of which are all received inside the gimbals 13.

A power supply 50 for the motor 16 is mounted in the ship 10. The power supply 50 is, for example, a battery or generator. The rotational speed of the motor 16 is controlled by frequency control using an inverter, so that the motor can rotate at a predetermined speed. This control obviates the need for a rotation-angle detection sensor such as an encoder or a resolver, and realizes a simple open rotational-speed control.

Figure 5:
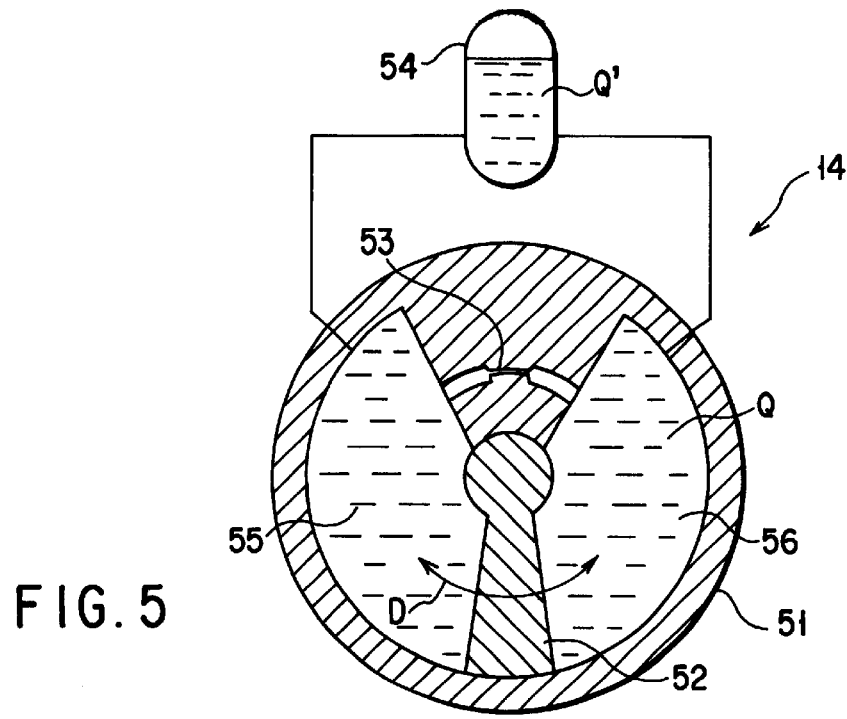
FIG. 5 is a sectional view schematically illustrating a damper structure employed in the oscillation suppression device of FIG. 2.

The damper 14 has a function for damping the rotation of the gimbals 13 relative to the base body 12, i.e., the rocking of the gimbals 13 around the first axis X1. The damper 14 is a dashpot type oil damper as schematically shown in FIG. 5. The damper 14 includes a short cylindrical housing 51 containing a hydraulic fluid Q, a partition member 52 received in the housing 51 so that it can rotate in a direction indicated by arrow D in FIG. 5, an orifice 53 and an accumulator 54, etc.

The short cylindrical housing 51 is attached to the base body 12 such that the axis of the housing 51 is parallel to the first axis X1. The axial length of the housing 51 is shorter than the outer diameter of the housing. At least a part of the housing 51 is exposed to the outside of the cover section 23 so as to enhance the heat dissipation of the damper 14.

The partition member 52 of the damper 14 partitions the interior of the housing 51 into first and second fluid chambers 55 and 56. When the base body 12 and gimbals 13 rotate (rock) around the first axis X1 relative to each other, the partition member 52 rotates relative to the housing 51 in the direction indicated by arrow D. When the partition member 52 rotates, the volume ratio of the fluid chamber 55 to the fluid chamber 56 changes, whereby the hydraulic fluid Q flows through the orifice 53. The resistance of the hydraulic fluid Q, which occurs in accordance with the cross section of the orifice 53, suppresses the oscillation of the gimbals 13.

The accumulator 54 connected to the fluid chambers 55 and 56 seals therein a pressurized hydraulic fluid Q'. The accumulator 54 absorbs changes in the volume of the hydraulic fluid due to thermal expansion.

The operation of the oscillation suppression device 11 will now be described.

An electric current is supplied to the stator member 41 of the motor 16, thereby generating a magnetic field between the rotor member 40 and stator member 41. This magnetic field causes the flywheel 15 to rotate at a predetermined high speed around the second axis X2 together with the rotor member 40. Gyro torque is generated during the rotation of the flywheel 15.

When the ship body 10a rolls in the direction indicated by arrow A in FIG. 1, the gyro torque suppresses the oscillation of the base body 12 and hence the rolling of the ship body 10a. Further, the damper 14 suppresses the rotation of the gimbals 13 around the first axis relative to the base body 12.

The rotor member 40 of the motor 16 is received in the recess 45 of the flywheel 15. The stator member 41 of the motor 16 is attached to the gimbals 13. In the inner motor 16 of this type, the heat generated by the motor 16 during its rotation is efficiently transmitted to the flywheel 15, gimbals 13 and base body 12, and is dissipated from the base body 12. Moreover, the flow of air, which occurs while the flywheel 15 is rotating at a high speed, accelerates the cooling of the motor 16 of the oscillation suppression device 11.

In the oscillation suppression device 11, the rotor member 40 and stator member 41, which constitute the motor 16, are both located inside the locus-of-rotation R of the gimbals 13. Further, the gimbals 13 and motor 16 are entirely covered with the cover section 23 of the base body 12. Accordingly, when the gimbals 13 oscillates, both the gimbals 13 and motor 16 oscillate inside the cover section 23.

This means that even if the gimbals oscillates, there is no danger of the limbs of a crew member being pinched by the gimbals 13 or motor 16. The cover section 23 also reduces the transmission of the sound of rotation of the motor 16 and flywheel 15 to the outside of the oscillation suppression device 11, thereby reducing the noise generated by the device 11.

Moreover, the oscillation suppression device 11 employs the thin dashpot type oil damper 14, and the gimbals bearings 30 and 31 are built into the side walls 21 and 22 of the base body 12, respectively. This means that the outer dimensions of the oscillation suppression device 11, such as the height, width, etc., can be reduced as compared to the conventional oscillation suppression device. Accordingly, the mounting space required for the device 11 can be reduced.

The compact base body 12 of the monocoque structure has a great stiffness and strength in all directions, including rolling and yawing directions. Accordingly, even if the gimbals 13 rotates around the first axis X1 and the plane of the rotation of the flywheel 15 inclines to the horizontal direction, thereby generating yaw-directional torque, the base body 12 can sufficiently resist the yaw-directional torque.

Figure 6:
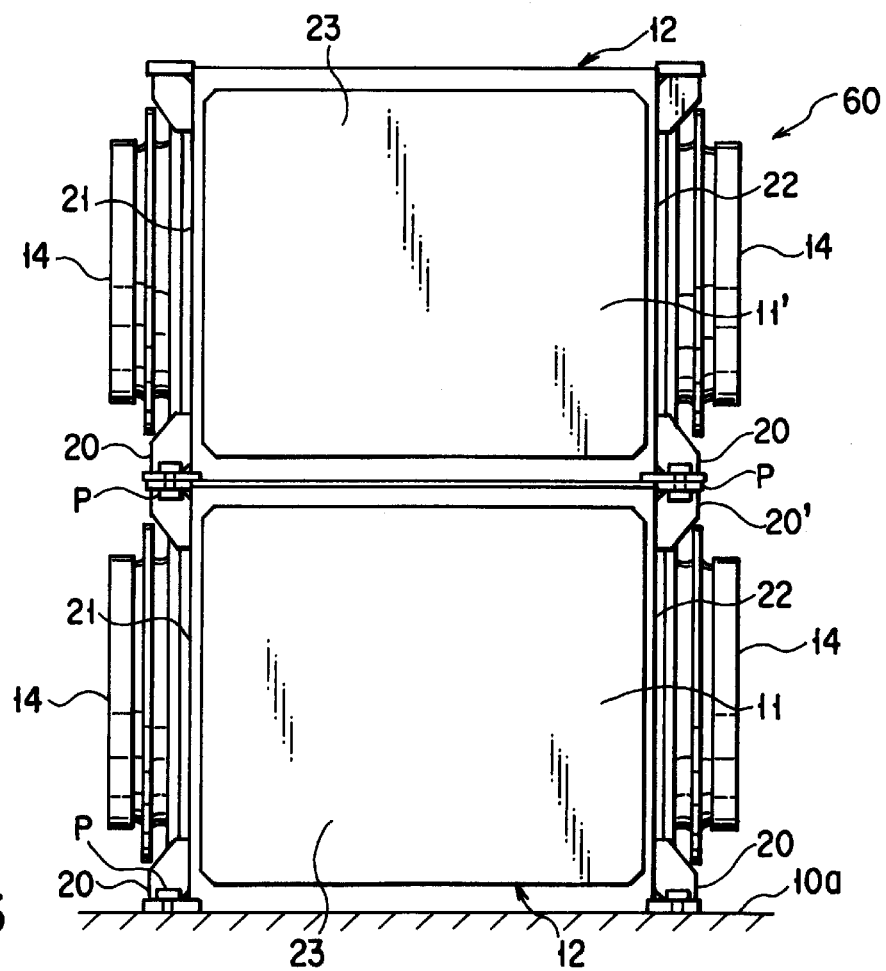
FIG. 6 is a front view illustrating an oscillation suppression system according to a second embodiment of the invention.

FIG. 6 illustrates an oscillation suppression system 60, which includes a plurality of (two in the case of FIG. 6) oscillation suppression devices 11 and 11', according to a second embodiment of the invention. In the second embodiment, the two oscillation suppression devices 11 and 11' are vertically stacked. Each of the devices 11 and 11' has the same structure and function as those of the first embodiment. The base bodies 12 of the oscillation suppression devices 11 and 11' are coupled by attachment sections 20 and coupling members P such as bolts and nuts, etc. Attachment sections 20 formed on the respective base bodies 12 of the monocoque structure enable the oscillation suppression devices 11 and 11' to be coupled to each other in a stacked state, using the coupling members P. The lower oscillation suppression device 11 is secured to the ship body 10a by other coupling members P.

Where a plurality of oscillation suppression devices 11 and 11' are vertically stacked as in the case of the oscillation suppression system 60, the same mounting space as in the first embodiment is required, but the resultant gyro torque is greater than the first embodiment and is proportional to the number of oscillation suppression devices stacked. In this case, a great load is applied to the attachment sections 20 of the lower oscillation suppression device 11. However, since the base body 12 of the monocoque structure has a high stiffness and strength, and the attachment sections 20 attached to the ship body 10a and attachment sections 20' coupled to the upper oscillation suppression device 11' also have a high strength, the strength of the two-stage oscillation suppression system 60 is not a matter of concern.

Figure 7:
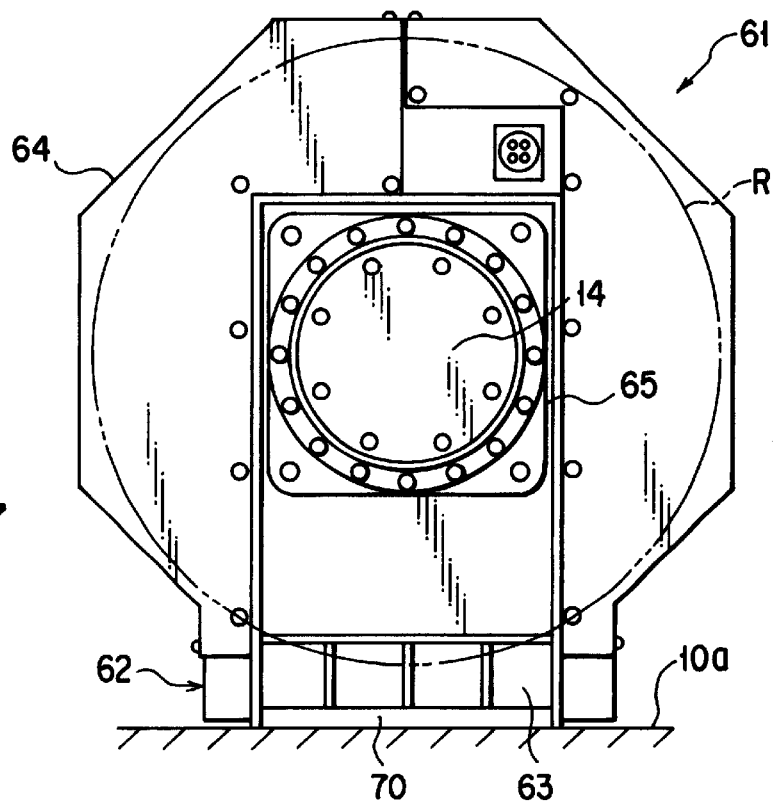
FIG. 7 is a side view illustrating an oscillation suppression device according to a third embodiment of the invention.
Figure 8:
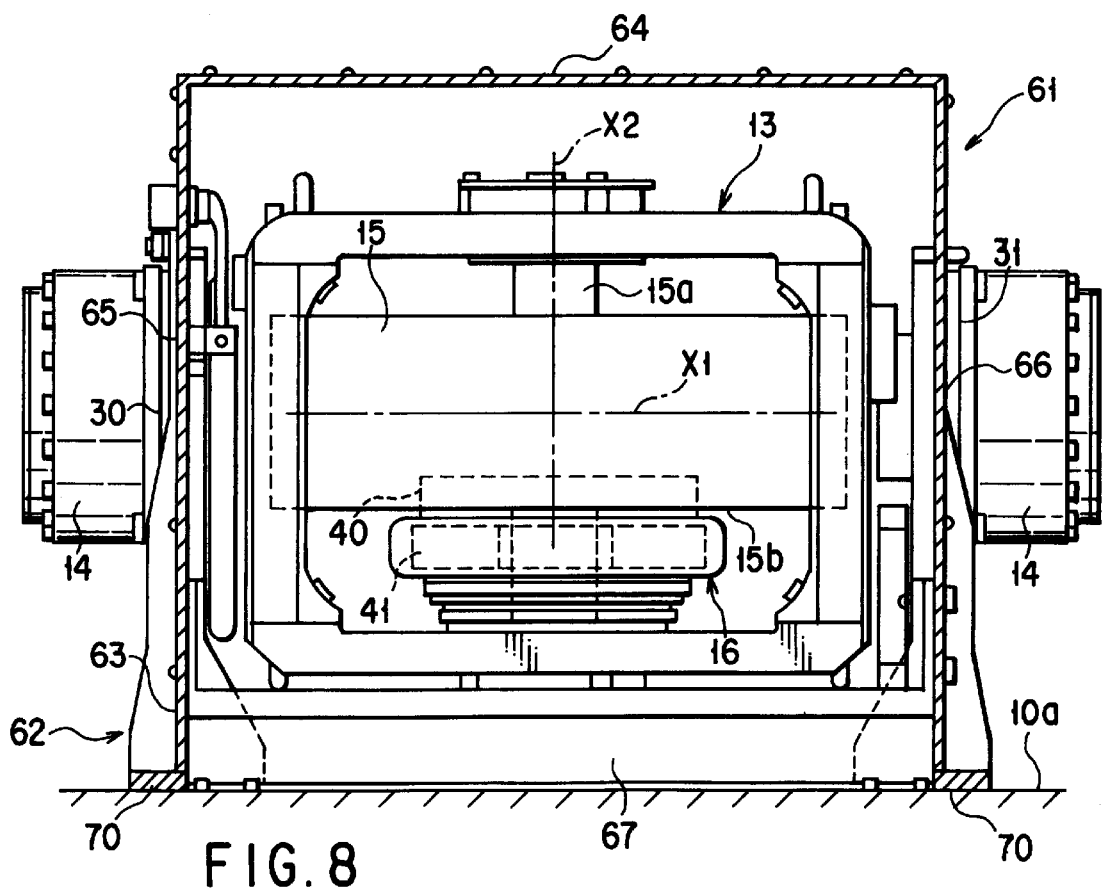
FIG. 8 is a partially broken front view illustrating the oscillation suppression device of FIG. 7.

FIGS. 7 and 8 illustrate an oscillation suppression device 61 according to a third embodiment of the invention. The gimbals 13, damper 14, flywheel 15 and motor 16, etc. of the oscillation suppression device 61 are similar to those of the oscillation suppression device 11 of the first embodiment. Therefore, in the first and third embodiments, like reference numerals denote like elements, and no detailed description is given thereof.

A base body 62 of the device according to the third embodiment comprises a frame 63 serving as a rigid frame member that supports the gimbals 13, and a cover section 64 covering the outer surface of the gimbals 13. The frame 63 includes a pair of side walls 65 and 66 and a coupling member 67 coupling them, etc. Gimbals bearings 30 and 31 are incorporated in the side walls 65 and 66, respectively. The frame 63 has attachment sections 70 for attaching the frame to the ship body 10a.

Also in the oscillation suppression device 61, the rotor member 40 and stator member 41 of the motor 16 are located inside the locus-of-rotation R of the gimbals 13, as shown in FIG. 7. Further, the outer surface of the gimbals 13 is covered with the cover section 64. Therefore, the oscillation suppression device 61 can provide the same advantage as the oscillation suppression device 11 of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An oscillation suppression device comprising:
   a base body having a monocoque structure and an attachment portion secured to a ship body;
   a gimbals supported by the base body such that the gimbals can rotate around a first axis;
   a flywheel provided in the gimbals such that the flywheel can rotate around a second axis perpendicular to the first axis;
   a motor which rotates the flywheel, said
   motor including a rotor member having at least a portion thereof received in a recess formed in an end face of the flywheel, and a stator member secured to the gimbals and opposed to the rotor member with a predetermined gap therebetween;
   said rotor member and the stator member are located inside a locus-of-rotation along which the gimbals rotates around the first axis;
   a dashpot type damper which suppresses rotation of the gimbals relative to the base body, and includes a short cylindrical housing exposed to an outside of the base body and containing a hydraulic fluid, a partition member rotatably received in the housing, and an orifice formed between a first liquid chamber and a second liquid chamber, the partition member partitioning an interior of the housing into the first and second liquid chambers, the partition member rotating within the housing in accordance with rotation of the base body relative to the gimbals;

bearings built into a pair of side walls of the monocoque type base body, respectively, the gimbals being rotatably supported by the base body via the bearings; and a cover portion provided at the base body and covering an outer surface of the gimbals.

2. An oscillation suppression device comprising:

a base body having an attachment portion to be secured to an object whose oscillation is to be suppressed;

a gimbals supported by the base body such that the gimbals can rotate around a first axis;

a damper which suppresses rotation of the gimbals relative to the base body, wherein the damper is a dashpot type damper which includes a short cylindrical housing containing a hydraulic fluid, a partition member rotatably received in the housing, and an orifice formed between a first liquid chamber and a second liquid chamber, the partition member partitioning an interior of the housing into the first and second liquid chambers, the partition member rotating within the housing in accordance with rotation of the base body relative to the gimbals;

a flywheel provided in the gimbals such that the flywheel can rotate around a second axis perpendicular to the first axis;

a motor which rotates the flywheel, and the motor including a rotor member attached to the flywheel, and a stator member attached to the gimbals and opposed to the rotor member with a predetermined gap therebetween, said rotor member and the stator member being located inside a locus-of-rotation along which the gimbals rotates around the first axis; and a cover portion formed on the base body and covering an outer surface of the gimbals, wherein the housing of the damper is exposed to an outside of the cover portion.

3. An oscillation suppression device comprising:

a base body having plural attachment portions to be secured to an object whose oscillation is to be suppressed, wherein the attachment portions enable a plurality of oscillation suppression devices to be coupled to each other in a stacked manner by a coupling member;

a gimbals supported by the base body such that the gimbals can rotate around a first axis;

a damper which suppresses rotation of the gimbals relative to the base body;

a flywheel provided in the gimbals such that the flywheel can rotate around a second axis perpendicular to the first axis;

a motor which rotates the flywheel, and the motor including a rotor member attached to the flywheel, and a stator member attached to the gimbals and opposed to the rotor member with a predetermined gap therebetween, said rotor member and the stator member being located inside a locus-of-rotation along which the gimbals rotates around the first axis; and a cover portion formed on the base body and covering an outer surface of the gimbals, wherein the base body has a monocoque structure, and portion of the base body serves as the cover portion.

* * * * *